United States Patent Office 3,346,187
Patented Oct. 10, 1967

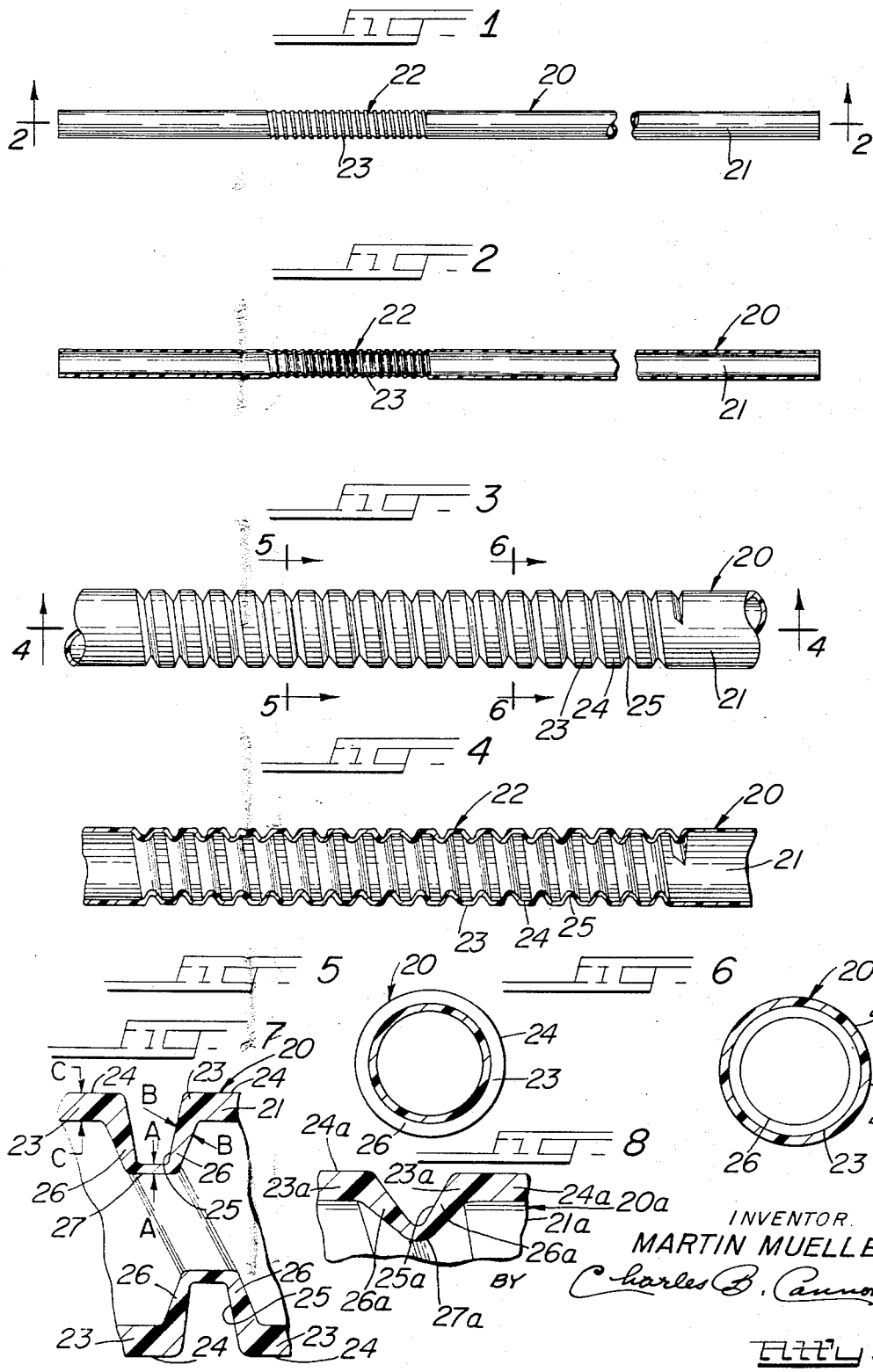

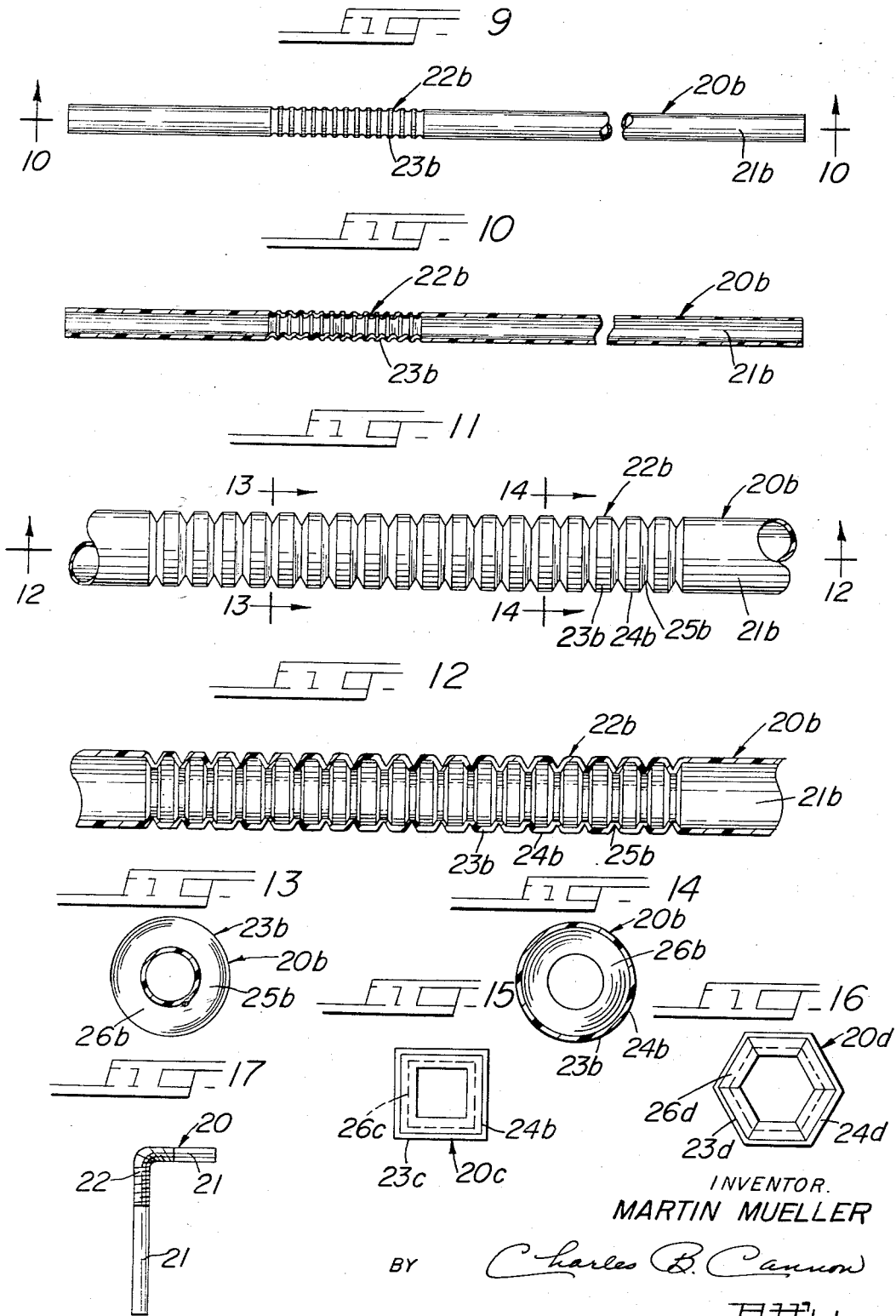

3,346,187
FLEXIBLE DRINKING STRAWS
Martin Mueller, Chicago, Ill., assignor to Flexible Plastic Straw Corporation, Chicago, Ill., a corporation of Illinois
Filed Mar. 28, 1966, Ser. No. 537,985
3 Claims. (Cl. 239—33)

ABSTRACT OF THE DISCLOSURE

A flexible tubular thermoplastic resinous drinking straw member including a tubular body having a corrugated flexible area molded therein between its ends. The corrugations have radially outer crests and are separated by intervening valleys. The valleys are formed by radially inner wall portions and are connected by angularly extending interconnecting web portions which are tapered downwardly and inwardly from their radially outer ends to their radially inner ends. The thickness of the radially inner wall portions of the valleys is substantially less than the thickness of the corrugations at their radially outer crests where the thickness of the corrugations is substantially equal to the thickness of the wall of the tubular body of the drinking straw member.

---

Tubular drinking straw members have been made heretofore of various materials including paper, glass and other materials.

However, the present invention relates to the manufacture of flexible formed tubular drinking straws made of thermoplastic resinous materials and which are so constructed that the main body portion thereof is relatively rigid but includes a flexible portion which may be readily bent or flexed both laterally and axially, that is, longitudinally through approximately 360° to facilitate use in drinking therefrom while returning, in general, to their original substantially straight tubular form when the manual bending force on the body of the tubular drinking straw member provides unimpeded flow through the inner bore or passage thereof when thus bent or flexed.

An object of the present invention is to provide a new and improved flexible formed thermoplastic tubular drinking straw member which is flexible and may be readily bent or flexed, both laterally and axially, that is, longitudinally, through approximately 360° to facilitate drinking therefrom while, at the same time, the body of the flexible tubular drinking straw member possesses sufficient innate resiliency and restorative power to return, in general, substantially to its normal straight position after the manual bending force thereon is released.

Another object of the present invention is to provide in the new flexible formed thermoplastic drinking straw member a novel construction for imparting the desired flexibility thereto.

Another object of the present invention is to provide a new and improved flexible formed thermoplastic tubular drinking straw member which is relatively simple and inexpensive in construction and which, in use, provides maximum flexibility with minimum impedance of flow through the central passage or bore therein when the new flexible straw is bent or flexed laterally or axially, that is, longitudinally.

An additional object of the present invention is to provide a new and improved thermoplastic resinous flexible tubular fluid-conducting member which may be readily bent or flexed both laterally or axially (longitudinally) through approximately 360° without interfering with the passage of liquid therethrough while, at the same time, returning, in general, to its original or straight form when the bending force thereon is removed.

Other objects will appear hereinafter.

In the drawings:

FIG. 1 is an elevational view of a thermoplastic flexible formed drinking straw embodying the present invention;

FIG. 2 is a central longitudinal sectional view on line 2—2 in FIG. 1;

FIG. 3 is an enlarged fragmentary elevational view of the new thermoplastic flexible formed drinking straw shown in FIGS. 1 and 2;

FIG. 4 is a central longitudinal sectional view on line 4—4 in FIG. 3;

FIG. 5 is an enlarged transverse sectional view on line 5—5 in FIG. 3;

FIG. 6 is an enlarged transverse sectional view on line 6—6 in FIG. 3;

FIG. 7 is an enlarged fragmentary detailed sectional view illustrating one form of construction of the flexible formed corrugated area of the new thermoplastic flexible formed drinking straw;

FIG. 8 is an enlarged fragmentary sectional detailed view, similar to FIG. 7, but illustrating a modification of the construction of the flexible formed corrugated area of the new thermoplastic flexible formed drinking straw;

FIG. 9 is an elevational view illustrating a modification of the invention;

FIG. 10 is a central longitudinal sectional view on line 10—10 in FIG. 9;

FIG. 11 is an enlarged fragmentary elevational view of the modification of the invention illustrated in FIGS. 9 and 10;

FIG. 12 is an enlarged central longitudinal sectional view on line 12—12 in FIG. 11;

FIG. 13 is an enlarged transverse sectional view on line 13—13 in FIG. 11;

FIG. 14 is an enlarged transverse sectional view on line 14—14 in FIG. 11;

FIG. 15 is an enlarged transverse sectional view illustrating another modification of the invention;

FIG. 16 is an enlarged transverse sectional view illustrating an additional modification of the invention; and FIG. 17 is a fragmentary elevational view illustrating the manner in which the new thermoplastic flexible formed resinous drinking straw may be bent to facilitate drinking therefrom in use without interfering with the free flow of liquid therethrough.

A typical embodiment of the new flexible thermoplastic resinous drinking straw is illustrated in FIGS. 1 to 7, inclusive, of the drawings, wherein it is generally indicated at 20, and comprises a flexible generally cylindrical tubular body 21 which may be formed by extruding or otherwise forming the same of any suitable flexible thermoplastic resinous material such, for example, as polyethylene polymers including linear and branched chain thermoplastic polymers, polypropylene polymers, copolymers of styrene and butadiene, high-impact polystyrene, oriented styrene, butadiene-acrylonitrile-styrene copolymers, cellulosic resinous materials, and like thermoplastic resinous materials.

The generally cylindrical body 21 of the new flexible thermoplastic resinous drinking straw 20 is generally rigid and self-supporting but includes a flexible formed area 22, which is, preferably disposed between the ends thereof, and which may be formed by hot or cold forming, or otherwise forming therein, in any suitable manner, a series of corrugations 23. The corrugations 23, in this form of the invention, are helical in form and have radially outer crests 24. The corrugations 23 are separated by intervening valleys 25, and the radially outer crests 24 of the corrugations 23 are connected to the radially inner wall portions 27 of the valleys 25 by angularly extending interconnecting web portions 26, as is best shown in FIG. 7.

In the manufacture of the new flexible thermoplastic resinous drinking straw members 20, as shown in FIGS. 1 to 7, inclusive, the interconnecting web portions 26, which interconnect the radially outer crests 24 of the corrugations 23 with the radially inner wall portions 27 of the valleys 25 are of gradually reduced thickness from their radially outer ends to their radially inner ends. Thus, for example, in a typical flexible thermoplastic resinous drinking straw member embodying the present invention, the thickness of the tubular wall 21 and of the corrugations 23, at their radially outer crests 24, is in the order or range of from 0.006 to 0.008 inch at the point indicated by the line C—C in FIG. 7; the thickness of the radially inner wall portions 27 of the valleys 25 is in the order of from 0.003 to 0.006 inch at the point A—A; and the thickness of the interconnecting web portions 26, at the midportions thereof, at the point indicated at B—B in FIG. 7, is in the order of from 0.004 to 0.005 inch. However, these dimensions are merely illustrative and may be varied considerably as long as the thickness of the radially inner walls 27 of the valleys 25, at the points A—A, and the thickness of the interconnecting web portions 26 at their midpoints, that is, at the points B—B, is not greater than or is less than the thickness of the tubular wall 21 and of the crests 24 of the corrugations 23 at the points C—C, as shown in FIG. 7. With this construction the desired flexibiltiy of the new flexible thermoplastic drinking straw 20 is maintained and the same may be bent or flexed both laterally and axially, that is, longitudinally through approximately 360° while, at the same time, the flexible corrugated area 22 therein possesses sufficient innate resiliency and restorative power to restore the body 21 of the new flexible drinking straw member substantially to its original condition, as in FIGS. 1 and 2, after it has been manually bent in the flexible area 22 to facilitate drinking therefrom, and the flexing or bending force applied thereto is relieved.

It will be noted, in this connection, that the thickness of the corrugations 23 at their radially outer crests 24 is substantially equal to the thickness of the tubular body 21 of the new drinking straw member 20; that the thickness of the wall portions 27 at the radially inner ends of the valleys 25 is substantially less than the thickness of the corrugations 23 at their radially outer crests 24; and that the thickness of the radially inner wall portions 27 is substantially less than the thickness of the interconnecting web portions 26 at their radially outer ends and at their midpoints (B—B).

A modification of the invention is illustrated in FIG. 8 of the drawings, and those parts in this form of the invention which are similar or comparable to corresponding parts in the form of the invention illustrated in FIGS. 1 to 7, inclusive, have been given the same reference numerals followed by the additional and distinguishing reference character a.

Thus, the form of the invention illustrated in FIG. 8 is substantially the same as the form of the invention illustrated in FIGS. 1 to 7, inclusive, except that in this form of the invention the intervening web portions 26a are tapered at a smaller acute angle, relative to the crests 24a of the corrugations 23a, than in the form of the invention illustrated in FIGS. 1 to 7, inclusive, and taper to a relatively narrow point 27a at the radially inner ends of the valley 25a, rather than tapering to a generally flat radially inner wall 27, as in the form of the invention illustrated in FIGS. 1 to 7, inclusive.

Another modification of the present invention is illustrated in FIGS. 9 to 14, inclusive, and those parts in this form of the invention which are similar to or comparable to corresponding parts in the form of the invention illustrated in FIGS. 1 to 7, inclusive, have been given the same reference numerals followed by the additional and distinguishing reference character b.

Thus the form of the invention illustrated in FIGS. 9 to 14, inclusive, is substantially similar to that shown in FIGS. 1 to 7, inclusive, except that in this form of the invention the flexible area 22b in the relatively stiff or rigid body 21b of the flexible drinking straw 20b is formed by a series of corrugations 23b which are parallel to each other, rather than being helical, as in the form of the invention illustrated in FIGS. 1 to 7, inclusive.

Another modification of the invention is illustrated in FIG. 15 of the drawings and in this form of the invention, those parts thereof which are similar to or comparable to corresponding parts in the form of the invention illustrated in FIGS. 1 to 7, inclusive, have been given the same reference numerals followed by the additional and distinguishing reference character c.

The form of the invention illustrated in FIG. 15 is substantially similar to that illustrated in FIGS. 1 to 7, inclusive, and to the form of the invention illustrated in FIGS. 9 to 14, inclusive, except that in this form of the invention the corrugations 23c are generally square in cross-sectional form, rather than being substantially cylindrical in cross-sectional form, as in the forms of the invention illustrated in FIGS. 1 to 7, inclusive, and in the form shown in FIGS. 9 to 14, inclusive, of the drawings.

A further modification of the invention is illustrated in FIG. 16 of the drawings and those parts thereof which are similar to or comparable to corresponding parts of the invention illustrated in FIGS. 1 to 7, inclusive, and in the form shown in FIGS. 9 to 14, inclusive, have been given the same reference numerals followed by the additional and distinguishing reference character d.

Thus, the form of the invention illustrated in FIG. 16 is substantially similar to that illustrated in FIGS. 1 to 7, inclusive, and to the form of the invention illustrated in FIGS. 9 to 14, inclusive, except that in this form of the invention the flexible corrugations 23d are hexagonal in cross-sectional form.

It is to be understood, however, that in the practice of the present invention, the tubular body of the new flexible thermoplastic resinous drinking straw member, and the corrugations which form the flexible area thereof, may be made in any desired geometrical cross-sectional form, in addition to and other than the substantially cylindrical form in which the new tubular drinking straw is shown in FIGS. 1 to 7, inclusive, and in FIGS. 9 to 14, inclusive, and in addition to the substantially square cross-sectional forms shown in FIG. 15, and the substantially hexagonal cross-sectional form shown in FIG. 16.

In the manufacture of the new flexible thermoplastic drinking straw 20 the width of each of the substantially flat crests 24 of each of the corrugations 23 is greater than the width of each of the valleys 25 at their radially outer ends (between the crests 24 of the corrugations 23). This construction is desirable in that it prevents the new flexible thermoplastic drinking straws 20 from being interlocked by engagement of the crests 24 in the valleys 25, when they are stacked in a carton or other package prior to use.

It will be noted that in the new flexible thermoplastic resinous drinking straws of the present invention the construction of the flexible corrugated area, as 22, preferably between the ends of the relatively stiff and rigid body 21, and the tapered arrangement of the side walls as 26, defining the valleys, as 25, between the corrugations 23, imparts to the new flexible thermoplastic resinous drinking straws the desired flexibility of the corrugated area 22 while, at the same time, giving it the desired restorative power to restore itself to a generally straight condition after each use thereof. At the same time, in the use of this construction, a maximum of flexibility is obtained without in any way detracting from the free-flowing character of the inner bore of the new thermoplastic resinous drinking straw or obstructing the free flow through inner bore thereof when it is flexed or bent during the drinking operation. This is a new and desirable result which has not been accomplished heretofore in paper drinking straws or drinking straws made of other materials.

It will thus be seen from the foregoing description, considered in conjunction with the accompanying drawings, that the present invention provides a new and improved flexible thermoplastic resinous tubular drinking straw member having the desirable advantages and characteristics and accomplishing its intended objects including those hereinbefore pointed out and others which are inherent in the invention.

I claim:

1. A flexible tubular thermoplastic resinous drinking straw member comprising a relatively stiff or rigid tubular body composed of flexible thermoplastic resinous material having integrally formed therein a flexible area defined by a series of spaced corrugations having radially outer crests and said corrugations being separated by intervening valleys; each of the said valleys being defined by a radially inner wall portion and angularly extending interconnecting web portions extending between and interconnecting the said radially outer crests of the said corrugations and the said radially inner wall portions of the said valleys the thickness of the said corrugations at their radially outer crests being substantially equal to the thickness of the wall of the said tubular body of the said flexible thermoplastic resinous drinking straw member; and the thickness of the radially inner wall portions of the said valleys being substantially less than the thickness of the said corrugations at their radially outer crests.

2. A flexible tubular thermoplastic resinous drinking straw member as defined in claim 1 in which the radially outer crests of the said corrugations and the radially inner wall portions of the said valleys, are joined by interconnecting web portions which are tapered radially downwardly and inwardly from their radially outer ends to the radially inner ends.

3. A flexible tubular thermoplastic resinous drinking straw member as defined in claim 2 in which the wall thickness of the said radially inner wall portions of the said valleys and the wall thickness of the said interconnecting web portions between the said crests of the said corrugations and the radially inner wall portions of the said valleys is not greater than the wall thickness of the said tubular body and of the said corrugations at their radially outer crests.

References Cited

UNITED STATES PATENTS

| 2,094,268 | 9/1937 | Friedman | 239—33 |
| 2,550,797 | 5/1951 | Friedman | 239—33 |

FOREIGN PATENTS 904,010  8/1962  Great Britain.

M. HENSON WOOD, Jr., *Primary Examiner.*

M. MAR, *Examiner.*